United States Patent Office 3,322,678
Patented May 30, 1967

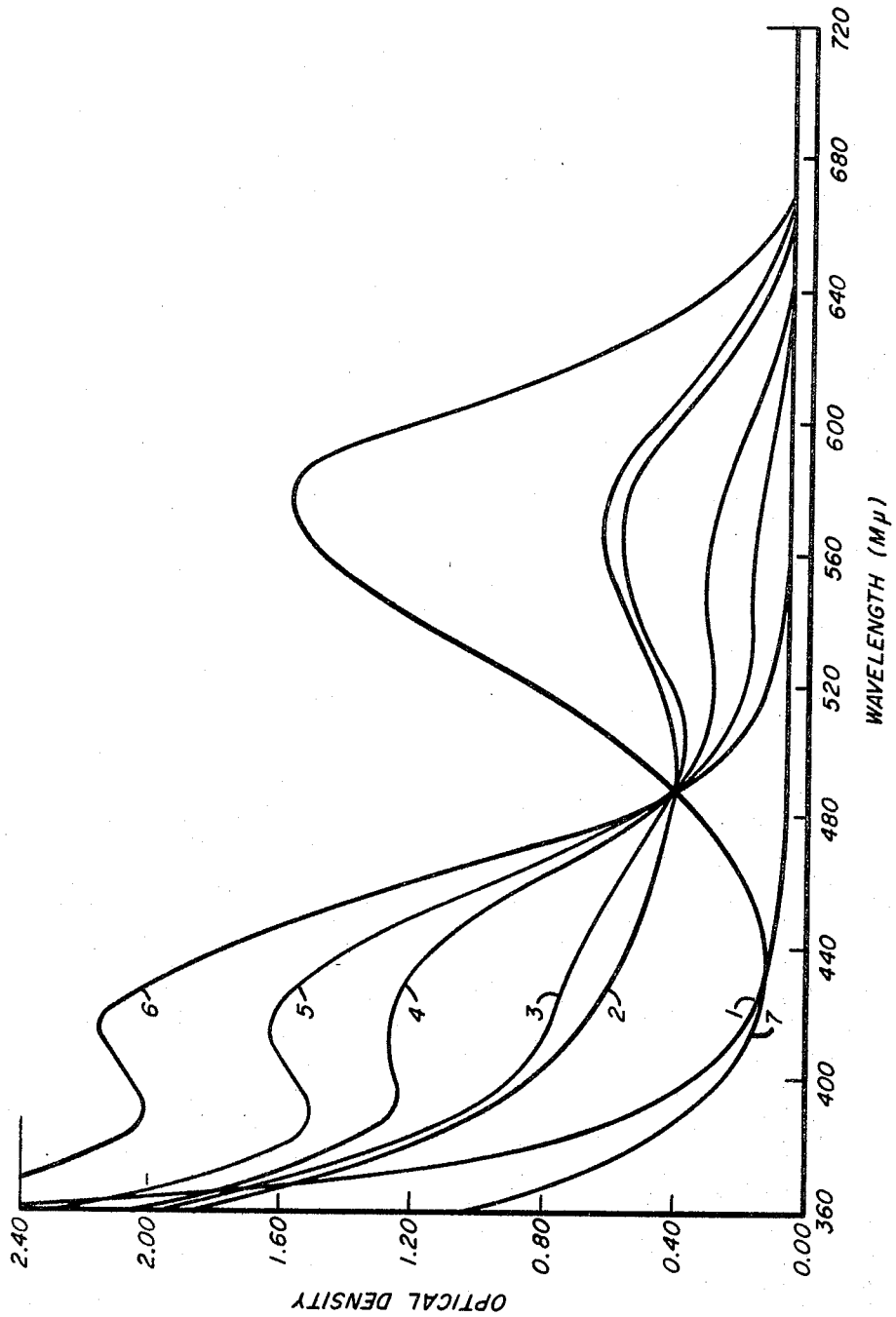

3,322,678
VARIABLE TRANSMISSION COMPOSITIONS
George Henry Dorion, New Canaan, Guenter Willi Nachtigall, Norwalk, and John Joseph Cerreta, Monroe, Conn., assignors to American Cyanamid Company, Stamford, Conn., a corporation of Maine
Filed June 17, 1964, Ser. No. 375,757
16 Claims. (Cl. 252—300)

This invention relates to a method for shifting the absorption wavelength of a thermoplastic resin containing 1',3',3'-trimethyl-6-nitro-spiro[2H - 1 - benzopyran - 2,2'-indoline] which comprises acidifying the resin with from about 0.1 to about 10 equivalents, based on the weight of the indoline, of an acid having the formula (1)
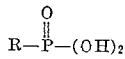

wherein R represent a halogenated alkyl radical containing from 1–4 carbon atoms, inclusive. More particularly, this invention relates to a composition of matter comprising a thermoplastic polymer having intimately dispersed throughout the body thereof 1',3',3'-trimethyl-6-nitro-spiro[2H-1-benzopyran - 2,2' - indoline] and from about 0.1 to 10 equivalents, based on the indoline, of an acid represented by Formula I.

The use of various variable transmission devices in the field of photography and the like is well known to those skilled in the art. These devices may take the form of filters etc. wherein certain wavelengths of light may be admitted, to the exclusion of certain other wavelengths of light, into contact with photographic film. The use of photochromic materials to form these variable transmission devices is becoming more commercially important than in the past. The necessity for variable transmission devices which exhibit their photochromic response in the short wavelength areas have become increasingly more prevalent. These systems are desirable in photographic devices wherein the photographic emulsion, i.e. the film, is sensitive to blue. The existence of photochromic systems which are active in the blue wavelength area is relatively rare and, in view of the extensive use of film which is sensitive in this area, any such photochromic system will obviously experience wide use.

We have now found that the absorption peak of a resinous material containing 1',3',3'-trimethyl-6-nitro-spiro-[2H-1-benzopyran-2,2'-indoline] which is normally in the area of from about 580 to about 585 m$\mu$ region of the spectrum (i.e. yellow), can be changed or shifted to a lower wavelength, and even to the 420 to 425 m$\mu$ region of the spectrum (i.e. blue) by the addition thereto of at least one of the specific group of acids. The shift in photochromic response unexpectedly occurs in the solid state, that is while the photochromic material is dispersed throughout the solid polymeric media, and changes from colorless to yellow (thereby absorbing blue) when subjected to ultraviolet light. The activation remains constant at relatively high temperatures and the media substantially indefinitely retains its ability to revert back to its original colorless state upon removal of the ultraviolet light.

It is therefore an object of the present invention to provide a method for shifting the region of photochromic response of a photochromic system towards a shorter wavelength by acidification of a plastic medium containing the photochromic compound 1',3',3'-trimethyl-6-nitro-spiro-[2H-1-benzopyran-2,2'-indoline].

It is a further object of the present invention to provide a composition of matter comprising a polymerized or polymerizable composition comprising a thermoplastic resin or thermoplastic resin-forming material, 1',3',3'-trimethyl-6-nitro-spiro[2H-1-benzopyran - 2,2' - indoline] and at least one phosphonic acid corresponding to those represented by Formula I.

These and other objects will become more apparent to one skilled in the art upon reading the more detailed description set forth hereinbelow.

*The phosphonic acids*

As mentioned above, we have found that the addition of a certain amount of a phosphonic acid represented by Formula I, above, to a resinous material containing 1',3',3'-trimethyl-6-nitro-spiro[2H - 1 - benzopyran - 2,2'-indoline] will cause a shift of the region of photochromic response of the system towards a shorter wavelength.

Types of acids which we have found useful in the present invention, which are represented by Formula I, include chloromethyl phosphonic acid, (2-chloroethyl) phosphonic acid, (3-chloropropyl)phosphonic acid, (4-chlorobutyl)phosphonic acid, (3-bromobutyl)phosphonic acid, (2-iodopropyl)phosphonic acid, (2-fluorobutyl)phosphonic acid, (bromomethyl)phosphonic acid, (dichloromethyl)phosphonic acid, (1,2-dichloroethyl)-phosphonic acid (2,3 - dibromopropyl)phosphonic acid, (1,4 - diiodobutyl)phosphonic acid, (2,4-difluorobutyl)phosphonic acid, (1,2,3-trichloropropyl)phosphonic acid, (trichloromethyl)phosphonic acid, and the like.

The phosphonic acids are generally well known in the art and may be produced in any known manner without varying from the scope of the present invention. Various methods for the production of phosphonic acids of this type are disclosed in, for example, U.S. Patents 2,678,940, 2,717,906, 2,874,184 and 3,032,500. Additional methods are disclosed in articles by Saunders et al., J. Chem. Soc., page 699, 1948; Kosolapoff, Organophosphorus Compounds, John Wiley and Sons Inc., New York, N.Y., publishers, p. 129 et seq., 1950; Kosolapoff et al., J. Am. Chem. Soc., volume 69, page 2020, 1947, and volume 74, page 4119, 1952, and these patents and references are hereby incorporated herein by reference.

Generally, these procedures result in the formation of the phosphonic acids by one of the following mechanisms:

(1)
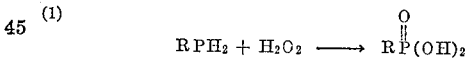

(2)
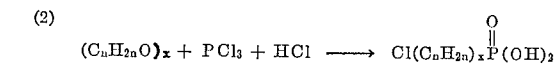

Yields of from 50% to 100% of theoretical are usually recovered, however, it is stressed that such procedures form no part of the present invention.

The acids should be present in the 1',3',3'-trimethyl-6-nitro-spiro[2H-1-benzopyran - 2,2' - indoline] compositions of the present invention in amounts ranging from about 0.1 to about 10 equivalents of acid to indoline, preferably about 0.5 equivalent to about 6 equivalents, on the same basis. The amount of acid employed is critical only from the aspect of practicality in that amounts lower than that specified above will effect a very minor, if not unobservable change in color when the composition is subjected to ultraviolet light, and higher amounts will not increase or further affect the absorption shift in that the complete shift has usually occurred within the above specified range. The phosphonic acid employed, of course, must, however, be compatible with the resin portion of the composition. The acid may be added to the resin system, as such, or as a solution, as long as the total amount subsequently present in the resulting composition remain in the above specified range.

The thermoplastic resins

Any thermoplastic polymer-forming monomer may be employed to form the resin portion of the compositions and, generally, the vinyl type monomers which are polymerizable, by any known method, via the vinyl unsaturation are preferably employed.

Examples of the monomers utilizable to form the vinyl type polymers which may be used in our novel compositions are the vinyl halides, the vinylidene halides, the vinyl acetates, polyvinyl butyral, butadiene copolymers, acrylonitrile, butadiene-styrene polymers, the acrylonitriles, etc. Additionally, one may utilize such polymers as the α-olefin polymers, such as the homopolymers and copolymers etc. containing, as the major constituent, ethylene, propylene, and the like and preferably the acrylate and methacrylate polymers produced from monomers having the formula (II) 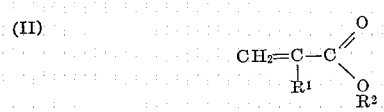

wherein R¹ is a hydrogen or methyl radical and R² is an alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and their corresponding alkyl methacrylates.

Additional examples of monomers which may be used to form the thermoplastic polymers encompassed by the present invention, polymerized either singularly or in combination with each other or with the other compounds set forth herein above, are such monomers as the unsaturated alcohol esters, more particularly, the allyl, methallyl, vinyl, etc., unsaturated esters of aliphatic and aromatic monobasic acids such, for instance, as acetic, propionic, butyric, crotonic, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various polysubstituted styrenes such, for example, as the various di-, tri-, and tetrachlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.

Other examples of monomers that can be used when in the form of polymers as the resin portion of our novel compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to polymers useful in the production of our novel compositions, are allyl methacrylate, allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, allyl diglycol carbonate, etc. Other examples of allyl compounds that may be employed are given, for example, in U.S. Patent No. 2,510,503, issued June 6, 1950.

Although all the above materials are applicable in the present system, as indicated above, it is preferred that the methacrylate monomers be employed for reasons dictated by the anticipated end uses of the compositions. That is to say, since the methacrylate polymers are generally optically clear, the resulting compositions, when formed into various articles such as films, etc. are also optically clear and therefore they may be used in such applications as sun-glasses, automobile windshields, optical lenses, photographic filters and other devices or articles of manufacture wherein optical clarity is a necessity, or, at least, desired.

The above-mentioned monomers may be polymerized, copolymerized, etc., in any known manner such as by the use of a free-radical generating catalyst, anionic catalysts, cationic catalysts and the like.

By way of example, such catalysts as the organic peroxide, such as methyl ethyl ketone peroxide, benzoyl peroxide; the hydroperoxides, such as cumene hydroperoxide; the persulfate type compounds, such as potassium persulfate may be employed. Additionally, such catalysts as lauroyl peroxide, 2,5-dimethyl-2,5-di(t-butylperoxy)hexane, the dialkyl peroxides, e.g., diethyl peroxide, dipropyl peroxide, dilauryl peroxide, dioleyl peroxide, distearyl peroxide, di-(tertiary-butyl)peroxide and di-(tertiary-amyl)peroxide, such peroxides often being designated as ethyl, propyl, lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g. acetyl benzoyl peroxide, propionyl benzoyl peroxide, etc.; terpene oxides, e.g., ascaridole, etc.; and salts of inorganic per-acids e.g. ammonium persulfate, sodium persulfate, sodium percarbonate, potassium percarbonate, sodium perborate, potassium perborate, sodium perphosphate, potassium perphosphate, etc. Other examples of organic peroxide catalysts which may be employed are the following: tetralin hydroperoxide, tertiary-butyl diperphthalate, tertiary-butyl perbenzoate, 2,4-dichloro-benzoyl peroxide, urea peroxide, caprylyl peroxide, p-chlorobenzoyl peroxide, 2,2-bis(tertiary-butylperoxy)butane, hydroxyheptyl peroxide, the diperoxide of benzaldehyde and the like may be used.

The azo-type polymerization catalysts are also well known to those skilled in the art and may be used to form the polymers used in the present invention. These catalysts are characterized by the presence of the

group bonded to one or two organic radicals, preferably at least one of the bonds being to a tertiary carbon atom. By way of example of suitable azo-type catalysts, α,α'-azobisisobutyronitrile, p-bromobenzenediazonium fluoborate, N-nitroso-p-bromoacetanilide, azomethane, phenyldiazoniumhalides, diazoaminobenzene, p-bromobenzenediazonium hydroxide and p-tolyldiazoaminobenzene may be used. The polymerization catalysts are usually used in small amounts, which are preferably not in excess of one percent, by weight, based upon the monomeric materials. Generally, a range of 0.05 to 0.5 percent, by weight, is suitable.

The polymerization may be carried out over a wide range of temperatures, as is known by those skilled in the art. In general, suitable temperatures will be found within the range of 0° C. to 220° C. The time required for complete polymerization depends not only upon the temperature but also upon the catalyst which is employed, the exotherm which occurs during the polymerization, and the monomers employed.

Polymerization regulators may be used in any of these processes, with compounds such as the organic sulfur compounds, i.e. the thio acids, mercaptans such as benzyl mercaptan, aliphatic mercaptans, possessing at least 6 carbon atoms such as octyl, dodecyl and tertiary dodecyl mercaptan, mixtures of mercaptans such as are obtained from lauryl alcohol, nitrohydroazine, amino compounds, carbon tetrachloride and any other well known polymerization modifier or regulator, being exemplary. Amounts ranging from about 0.01% to 5.0%, by weight, of the monomers employed, are generally known to be useful.

Solvent solution polymerization processes may also be used with such solvents as xylene, toluene, dimethylformamide and the like being employed with the same free-radical catalysts and conditions mentioned above.

It should be pointed out, however, that the above methods for the production of the polymeric resins are not within the scope, and form no part, of the present invention except to the extent mentioned hereinbelow in regard to the addition of the components of our novel compositions to one another.

The third critical component of our novel composition is, of course, the 1',3',3'-trimethyl-6-nitrospiro[2H-1-benzopyran-2,2'-indoline]. This compound need only be present in the composition in amounts such that the composition will exhibit a sufficiently pronounced color change when subjected to ultraviolet light. We have found that a range of from about 0.01% to about 20%, by weight, based on the weight of the resin is usually sufficient to obtain optimum results. 1',3',3' - trimethyl - 6-nitro-spiro [2H-1-benzopyran-2,2'-indoline] is known in the art and may be prepared by any known procedure such as by that more specifically disclosed in U.S. Patent Nos. 2,953,-454 and 3,022,318 which patents are hereby incorporated herein by reference.

The components which make up our novel compositions may be added to one another as such or from solution and, furthermore, the resinous component may be added as a polymerizable monomer or a prepolymer as well as a preformed polymer. When added as a monomer, the whole system, i.e. the indoline, the acid and the monomer is subjected to polymerization under conditions well known to those skilled in the art, and mentioned, more fully, hereinabove, to produce our novel compositions. When produced according to this method, the only critical limitations in the procedure reside in the necessity that the components being subjected to the conditions of polymerization be stable and unaffected thereby.

Alternatively, the resinous component may be added as a prepolymer in the presence of additional monomer, the acid and the indoline and the resulting composition may then be further polymerized to obtain the final composition, in the same manner as described hereinabove in regard to the polymerizable monomers.

Furthermore, the polymer component may be added as a preformed polymer, from a solution or as a powder. The order of addition of the acid, indoline and polymer is not critical. Therefore, the indoline may be added to the resin and then the acid added or the acid and indoline may first be mixed and then added to the polymer. Additionally, all three components may be blended together simultaneously. When applied as solids, the acid and indoline may be added to the polymer by milling on, for example, a two-roll mill, in a Banbury mixer etc. or by molding, extruding or casting the three ingredients together to form the desired article.

Our novel compositions may be formed, e.g. molded, cast, etc., into such shapes as films, fibers, and the like by known techniques without detracting from their photochromic phenomena at the modified or shifted wavelength. When a film is being produced, the total composition may be formed into a solution by dissolving it in a suitable solvent such as a methyl ethyl ketone-methyl isobutyl ketone mixture. The resulting solution can then be drawn down on a solid substrate such as glass, metal, a polymeric film, and the like and allowed to set at room temperature until the solvent has evaporated. The film may be used as such or may then be removed from the substrate in any manner. In this case, either a self-supporting film or a coated substrate is formed, each of which exhibits the photochromic phenomena at the shifted wavelength.

If a casting of the composition is being produced, the only critical limitation is that the curing must be so controlled that the rigidity of the resulting casting does not exceed a certain maximum value, corresponding to a Rockwell hardness (R-scale) of not more than about 110. This can be accomplished by regulating the curing conditions in such a way that a residual monomer content of at least about 10% is retained in the resulting casting. Alternatively, any suitable plasticizer, such as dioctyl phthalate, may be added to the casting composition in amounts up to about 25%, whereby the role of the residual monomer in limiting the rigidity of the resulting casting is partially or wholly taken over by the plasticizer and the necessity for critical control of the curing conditions is partially or wholly eliminated.

Various additives such as fillers, stabilizers, dyes, pigments, antistatic agents, antioxidants and other modifiers may, of course, be added to the resin portion of our novel compositions without detracting from the advantageous properties and characteristics mentioned hereinbefore.

The accompanying drawing is a graphic representation showing the change in photochromic response of film formulations of poly(methyl methacrylate) containing 5% 1',3',3'-trimethyl-6-nitro-spiro[2H-1-benzopyran - 2, 2'-indoline] and varying amounts of chloromethyl phosphonic acid. The change in the wavelength peak with the varying amounts of acid in comparison to curves for the activated and non-activated indoline is shown. The curves represent the results achieved according to the method of the instant invention as set forth in Example 1, hereinbelow.

The following examples are set forth for purposes of illustration only and are not to be construed as limitations on the present invention. All parts and percentages are by weight unless otherwise specified.

EXAMPLE 1

To 100 parts of poly(methyl methacrylate) in a 20% solution of methyl ethyl ketone/methyl isobutyl ketone mixture (80/20) are added 5.0 parts of 1',3',3'-trimethyl-6-nitro-spiro[2H - 1 - benzopyran-2,2'-indoline]. The resultant mixture is then drawn down on a ⅛ inch sheet of glass and allowed to set by evaporation of the solvent at room temperature. The curve representing the resultant coated film in its non-activated form is set forth as number 1 in the accompanying drawing.

Following the procedure of Example 1, varying amounts of chloromethyl phosphonic acid are added to the solution of polymer and indoline before forming a film on the glass. The results of these additions are set forth hereinbelow in Table I, with the changes in absorption wavelength as a result of each addition being represented by the example number in the accompanying drawing.

TABLE I

| Example | Equivalents Acid Added [1] | Irradiation Time,[2] min. | Wavelength Peak (mμ) |
|---|---|---|---|
| 1 | 0.00 | 0 | |
| 2 | 0.25 | 5 | 425 and 575 |
| 3 | 0.50 | 5 | 440 |
| 4 | 0.75 | 5 | 425 |
| 5 | 1.00 | 5 | 425 |
| 6 | 1.25 | 5 | 425 |
| 7 | 0.00 | 5 | 585 |

[1] Based on percent indoline in solution.
[2] RS Sunlamp used.

As can be seen from the drawing, as the amount of acid added is increased, the wavelength peak of the indoline dramatically shifts from about 575 mμ to about 425 mμ.

EXAMPLES 8–14

A 30% poly(methyl methacrylate), in methyl methacrylate, prepolymer syrup is prepared by adding the polymer to the monomer with agitation. Varying amounts of 1′,3′,3′-trimethyl - 6 - nitro-spiro[2H-1-benzopyran-2,2′-indoline] are added along with varying amounts of chloromethyl phosphonic acid. 0.008%, based on monomer, of azobisisobutyronitrile is added to the resulting solution and the whole system is vacuum degassed and then introduced into a casting cell of two parallel ¼ inch tempered glass plates separated by a gasket of desired thickness. The whole cell is then placed into a curing oven and the resin is polymerized and cured for 16.5 hours at 60° C. The results achieved when the resultant casting is irradiated with an RS Sunlamp for 30 seconds are specified in Table II below.

TABLE II

| Ex. | Active Components | | Photochromic Response Optical Density Change at— | | Appearance of Casting |
|---|---|---|---|---|---|
| | I Indoline (weight percent) | II Acid (Equiv./ Mole I) | 425 mμ | 585 mμ | |
| 8 | 0.1 | 0 | | >2.0 | Clear. |
| 9 | 0.1 | 2.0 | .78 | .25 | Slight haze. |
| 10 | 0.1 | 4.0 | .92 | .02 | Do. |
| 11 | 0.1 | 6.0 | .97 | .00 | Do. |
| 12 | 0.05 | 2.0 | .71 | .31 | Clear. |
| 13 | 0.05 | 4.0 | .89 | .04 | Do. |
| 14 | 0.05 | 6.0 | .94 | .01 | Do. |

EXAMPLES 15–24

Following the procedure of Examples 8–14, a prepolymer syrup containing 0.05% of 1′,3′,3′-trimethyl-6-nitro-spiro[2H-1-benzopyran-2,2′-indoline] and 6.0 equivalents of chloromethyl phosphonic acid is subjected to various curing cycles. The results are set forth hereinbelow in Table III. The criticality of the monomer content and hardness of the resultant castings is evident.

TABLE III

| Ex. | Curing Treatment, Hrs. | | | Optical Density Change [1] | Monomer Content | Rockwell Hardness (R scale) |
|---|---|---|---|---|---|---|
| | 52° C. | 60° C. | 100° C. | | | |
| 15 | | 16.5 | | .78 | 9.9 | 111 |
| 16 | | 16.5 | 2.0 | .38 | 4.7 | 120 |
| 17 | | 22 | | .87 | 10.3 | 111 |
| 18 | | 38 | | .84 | 10.3 | 111 |
| 19 | 22 | | | .94 | 12.8 | 100 |
| 20 | 38 | | | .93 | 13.8 | 102 |
| 21 | 16.5 | | | .93 | 17.9 | 29 |
| 22 | 16.5 | | 2.0 | .23 | 7.1 | 118 |
| 23 | 16 hrs. at 48° C. increased to 105° C. over 2.5 hrs. | | | .94 | 14.7 | 87 |
| 24 | 2½ days at 48° C. increased to 100° C. over 2.5 hrs. | | | .35 | 6.2 | 120 |

[1] 1–30 seconds irradiation, RS sunlamp.

EXAMPLES 25–34

Following the procedures of either Example 1 or Example 8, various acids are added to various other resin systems to produce moldings or castings exhibiting a shifted adsorption peak over the indoline alone. The results of these examples are set forth in Table IV.

TABLE IV

| Ex. | Acid | Process of Ex. No. | Equiv. | Indoline, percent | Resin | Wavelength Peak (mμ) | Appearance of Casting |
|---|---|---|---|---|---|---|---|
| 25 | CBPA | 1 | 2.0 | 1.0 | PE | 425 | |
| 26 | TCMPA | 1 | 6.0 | 3.0 | MMA/ST/AN, 71/19/10 | 425 | |
| 27 | BMPA | 8 | 0.5 | 1.0 | PS | 440 | Slight haze. |
| 28 | DCEPA | 1 | 0.5 | 1.0 | CAB | 440 | |
| 29 | TCBPA | 8 | 4.0 | 1.0 | PEA | 425 | Clear. |
| 30 | TCMPA | 8 | 1.0 | 1.0 | PMMA | 425 | Do. |
| 31 | FBPA | 1 | 0.25 | 1.0 | PP | 425 and 575 | |
| 32 | TFMPA | 1 | 6.0 | 0.5 | PVC | 425 | |
| 33 | DIPPA | 8 | 0.75 | 2.0 | PAN | 425 | Slight haze. |
| 34 | IEPA | 1 | 1.0 | 2.0 | BD/ST, 5/95 | 425 | |

*Code for Table IV*

PE=polyethylene; MMA=methyl methacrylate; ST=styrene; AN=acrylonitrile; PS=polystyrene; CAB=cellulose acetate butyrate; PEA=poly(ethyl acrylate); PMMA=poly(methyl methacrylate); PP=polypropylene; PVC=poly(vinyl chloride); PAN=poly(acrylonitrile); BD=butadiene; CBPA=(4-chlorobutyl)phosphonic acid; TCMPA=trichloromethylphosphonic acid; BMPA=bromomethylphosphonic acid; DCEPA=(1,2-dichloroethyl)phosphonic acid; TCBPA=1,2,3,4 - (tetrachlorobutyl) phosphonic acid; FBPA=(2-fluorobutyl)phosphonic acid; TFMPA=trifluoromethylphosphonic acid; DIPPA=(1,3-diiodopropyl)phosphonic acid; IEPA=(2-iodoethyl)phosphonic acid.

What is claimed is:
1. A method for shifting the absorption wavelength of a composition of matter comprising (1) a thermoplastic resin and (2) 1′,3′,3′-trimethyl-6-nitro-spiro[2H-1-benzopyran-2,2′-indoline] to a lower wavelength which comprises acidifying said composition with from about 0.1 to about 10 equivalents, based on said indoline, of a phosphonic acid having the formula

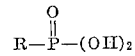

wherein R is a halogenated alkyl radical of from 1 to 4 carbon atoms, inclusive.
2. A method according to claim 1 wherein the phosphonic acid is chloromethylphosphonic acid.
3. A method according to claim 1 wherein the phosphonic acid is trichloromethylphosphonic acid.

4. A method according to claim 1 wherein the thermoplastic resin is a polymer of a compound having the formula

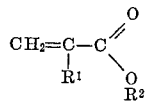

wherein $R^1$ is selected from the group consisting of hydrogen and a methyl radical and $R^2$ is an alkyl radical of from 1–6 carbon atoms, inclusive.

5. A method according to claim 4 wherein said phosphonic acid is chloromethylphosphonic acid.

6. A method according to claim 4 where said phosphonic acid is trichloromethylphosphonic acid.

7. A method according to claim 1 wherein the thermoplastic resin is poly(methyl methacrylate) and the phosphonic acid is chloromethylphosphonic acid.

8. A method according to claim 1 wherein the thermoplastic resin is poly(methyl methacrylate) and the phosphonic acid is trichloromethylphosphonic acid.

9. A composition of matter comprising a thermoplastic resin having dispersed throughout the body thereof (1) a photochromic amount of 1′,3′,3′ - trimethyl - 6 - nitrospiro[2H-1-benzopyran-2,2′-indoline] and (2) from about 0.1 to 10 equivalents, based on (1), of a phosphonic acid having the formula

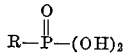

wherein R is a halogenated alkyl radical of from 1 to 4 carbon atoms, inclusive.

10. A composition according to claim 9 wherein said acid is chloromethylphosphonic acid.

11. A composition according to claim 9 wherein said acid is trichloromethylphosphonic acid.

12. A composition according to claim 9 wherein the thermoplastic resin is a polymer of a compound having the formula

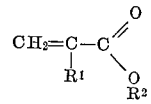

wherein $R^1$ is selected from the group consisting of hydrogen and a methyl radical and $R^2$ is an alkyl radical of from 1–6 carbon atoms, inclusive.

13. A composition according to claim 12 wherein said phosphonic acid is chloromethylphosphonic acid.

14. A composition according to claim 12 wherein said phosphonic acid is trichloromethylphosphonic acid.

15. A composition according to claim 9 wherein the thermoplastic resin is poly(methyl methacrylate) and the phosphonic acid is chloromethylphosphonic acid.

16. A composition according to claim 9 wherein the thermoplastic resin is poly(methyl methacrylate) and the phosphonic acid is trichloromethylphosphonic acid.

References Cited

UNITED STATES PATENTS

| | | | |
|---|---|---|---|
| 2,439,374 | 3/1948 | Leader et al. | 252—300 |
| 2,717,906 | 9/1955 | Lecher | 260—500 |
| 2,953,454 | 9/1960 | Berman | 96—89 X |

LEON D. ROSDOL, *Primary Examiner.*

ALBERT T. MEYERS, J. D. WELSH, *Examiners.*